(12) United States Patent
Jensson

(10) Patent No.: US 10,909,880 B2
(45) Date of Patent: Feb. 2, 2021

(54) LANGUAGE LEARNING SYSTEM ADAPTED TO PERSONALIZE LANGUAGE LEARNING TO INDIVIDUAL USERS

(75) Inventor: Arnar Thor Jensson, Reykjavik (IS)

(73) Assignee: COOORI EHF, Reykjavik (IS)

( * ) Notice: Subject to any disclaimer, the term of this patent is extended or adjusted under 35 U.S.C. 154(b) by 1020 days.

(21) Appl. No.: 14/116,700

(22) PCT Filed: May 10, 2012

(86) PCT No.: PCT/IS2012/000002
§ 371 (c)(1),
(2), (4) Date: Jan. 29, 2014

(87) PCT Pub. No.: WO2012/153354
PCT Pub. Date: Nov. 15, 2012

(65) Prior Publication Data
US 2014/0170613 A1    Jun. 19, 2014

Related U.S. Application Data

(60) Provisional application No. 61/484,569, filed on May 10, 2011.

(30) Foreign Application Priority Data

May 11, 2011  (IS) .............................................. 8953

(51) Int. Cl.
*G09B 19/06*    (2006.01)
(52) U.S. Cl.
CPC .................... *G09B 19/06* (2013.01)
(58) Field of Classification Search
CPC ........... G09B 7/00; G09B 17/00; G09B 19/06
(Continued)

(56) References Cited

U.S. PATENT DOCUMENTS 6,077,085 A    6/2000  Parry et al.
6,652,283 B1   11/2003 Van Schaack et al.
(Continued)

FOREIGN PATENT DOCUMENTS

JP    2001337594 A    12/2001

OTHER PUBLICATIONS

International Search Report for corresponding PCT Application No. PCT/IS2012/000002, dated Aug. 28, 2012.
(Continued)

*Primary Examiner* — Eddy Saint-Vil
(74) *Attorney, Agent, or Firm* — Workman Nydegger

(57) ABSTRACT

A learning system and a method adapted to personalize language learning to individual users. An output device generates and presents learning related data to a user associated with a user ID. An input mechanism receives, in response to the learning related data, response data from the user indicating the users response to the learning related data. A processor associates the learning related data to the response data to couple the response from the user to the learning related data. A database including a storage space associated to the user ID is used for storing the learning related and the associated response data and generates an individualized language knowledge database for the user. The processor is adapted to issue a true ($t_i$) or false ($f_i$) learning related data indicators indicating whether the response data matches the learning related data presented to the user.

12 Claims, 11 Drawing Sheets

(58) Field of Classification Search
USPC .................................. 434/335, 156, 157, 362
See application file for complete search history.

(56) References Cited

U.S. PATENT DOCUMENTS

| | | | | |
|---|---|---|---|---|
| 2006/0078856 A1* | 4/2006 | Kellman | .................. | G09B 7/00 434/118 |
| 2007/0048696 A1* | 3/2007 | Blank | .................... | G09B 17/00 434/156 |
| 2007/0269775 A1* | 11/2007 | Andreev | .................. | G09B 7/00 434/156 |
| 2010/0035225 A1* | 2/2010 | Kerfoot, III | ............. | G09B 7/00 434/335 |
| 2011/0262890 A1* | 10/2011 | Kanemoto | ............... | G09B 7/00 434/362 |

OTHER PUBLICATIONS

"Spaced Repetition," Wikipedia, URL: http://en.wikipedia.org/w/index.php?title=Spaced_repetition&oldid=427688570, retrieved on Nov. 5, 2013, pp. 1-3.

* cited by examiner

LANGUAGE LEARNING SYSTEM ADAPTED TO PERSONALIZE LANGUAGE LEARNING TO INDIVIDUAL USERS

FIELD OF THE INVENTION

The present invention relates to a language learning system and method adapted to personalize language learning to individual users.

BACKGROUND OF THE INVENTION

Some improvements have been made in language learning for users in past years. In one prior art U.S. Pat. No. 6,077,085A an improved method is proposed, a learn, test and review method is used. A spaced review system is described using layered pool advance spacing were items are arranged in study pools after previous accomplishment, then each pool is targeted for review and advancing to the next review pool is based upon successful review of all items in a given pool making it possible for few items to slow down the whole study process. This is a discontinuous study process; further more effectiveness is limited by grouping items into review pools. In another prior art, U.S. Pat. No. 6,652,283 describes a method for maximizing the effectiveness and efficiency of learning, retaining and retrieving knowledge and skills based on metacognitive methodology. A Learn Module, a Review Module and a Test Module is provided, where each of these modules are capable of operating independently and are preferably arranged to operate interactively such that operation of each of the Learn, Review and Test Modules are changed based on a user's past performance within one or more of the three modules. Despite the improvements described in U.S. Pat. No. 6,652,283 in monitoring and improving the users metacognitive skills, it is not fully tailored to maximize the effectiveness of language learning. Furthermore it is still not a fully continuous learning process, it requires the user to operate the learn module to learn items, the test module to test his memory retention of each item learned and then the review module to maintain a desired level of memory retention.

The inventor of the present invention has appreciated that there is thus a need for an improved language learning system and a method and has in consequence devised the present invention.

SUMMARY OF THE INVENTION

It would be advantageous to achieve a language learning system that is capable of improving the language learning and adapt it to individual users. In general, the invention preferably seeks to mitigate, alleviate or eliminate one or more of the above mentioned disadvantages singly or in any combination. In particular, it may be seen as an object of the present invention to provide a language learning system that solves the above-mentioned problems, or other problems, of the prior art.

To better address one or more of these concerns, in a first aspect of the invention a language learning system is provided adapted to personalize language learning to individual users, comprising:

an output means (O_M) for generating and presenting learning related data to a user associated with a user ID,
an input means (I_M) adapted to receive, in response to said learning related data, response data from the user indicating the users response to said learning related data,
a processor (P) for associating said learning related data to said response data so as to couple the response from the user to said learning related data, and
a database including a storage space associated to the user ID for storing said learning related and said associated response data and thus generating an individualized language knowledge database for the user,
wherein the processor (P) is further being adapted to:
issue a true ($t_l$) or false ($f_l$) learning related data indicators indicating whether the response data matches the learning related data presented to the user, the $t_l$ or $f_l$ indicators subsequently being associated to said learning related data and stored at said storage space, monitor said $t_l$ indicators in said storage space and based thereon repetitively presenting learning related data having associated $t_l$ indicator to the user with user-specific ascending memory spaced interval which is registered and associated to the learning related data until a pre-defined time interval limit has been reached, and based thereon select at least one task to be presented to the user by said output means,
where within said at least one task plurality of task specific exercises each of which includes at least one learning related data where said pre-defined interval has been reached are presented to the user with task time ascending intervals in case user's reply to previous task specific exercises is correct or satisfactory.

Accordingly, by systematically increasing this user-specific ascending memory time interval for the learning related data the system ensures that the entries will go "deeper" in the user's memory and in that way the system will model individual entries for each individual user. Said pre-defined time interval limit for the learning related data changes with the user's language skills, i.e. it is adapted to each individual user and may vary from e.g. few hours up to few days or weeks. This means that for some users that are very good in language learning these pre-defined time interval limits for the learning related data can be less than for other users, for the same learning related data. The pre-defined time intervals limits can theoretically then be increased into years and even decades, or be decreased into few months or weeks depending on the user's potential to learn a language. It is therefore possible to indicate when e.g. certain entries are ready to be used in a more "advanced" level for a certain task. Also, this language learning system is capable of linking different usage of e.g. entries with how well the user memorizes them and in that way it is possible to keep track of the user data history which becomes more detailed and gives a better insight into the user's improvements since now e.g. the entries that have been presented to the user are marked with true or false indicator. The term entry may according to the present invention mean one or more words e.g. "to write", or a single entry in one language but two or more entries in another language. In this case, a single entry may be associated to two or more words and vice versa. It may also be many to many mapping, e.g. idioms such as "rain cats and dogs (idiom)", or, "rignir mjög mikið", which is Icelandic and means "rains very much" (idiom).

In one embodiment, said process of presenting learning related data by said output means includes presenting the learning related data in a first language and in a second language simultaneously.

In one embodiment, subsequent to present said user with said learning related data in said first and second languages the user is presented with said learning related data in a first language and at least one suggestion entry of a learning related data in said second language, said input from the user via said input means being whether said suggestion entry corresponds to said learning related in the second language.

In one embodiment, said at least one task is run parallel and independent from said process of presenting learning related data by said output means, said at least one task being run independent from each other such that while presenting said user with said task specific exercises learning related data are presented to the user simultaneously.

In one embodiment, said processor is operable to start a new task parallel to said process of presenting learning related data and parallel to the task already being run, said decision of starting said new task being based on monitoring said user-specific ascending memory spaced interval and utilize said memory time as an indicator of how "deep enough" the learning related data is in the user's memory.

In one embodiment, said task time ascending intervals are spaced individually based on task specific forgetting curves each of the task specific forgetting curves being characteristic for each individual task.

In one embodiment, for each individual user, said processor is further operable to utilize said learning related data presented to the user to determine a forgetting-curve coefficients for each task, the forgetting-curve coefficients being indicative of how easily each individual user remembers new learning related data.

In one embodiment, said exercises within said tasks are formed by a multiple of learning related data including at least one learning related data where said pre-defined time interval limit has been reached, the processor further being adapted to:
  select an exercise in accordance to a set of rules including selecting at least one of the remaining learning related data in said task in accordance to said associated user-specific time intervals so as to optimize and individualize the exercises to the user,
  receive, in response to exercise presented to the user, response data from the user via said input means (I_M) indicating the users response to said exercise,
  issue a true-task ($t_t$) or false-task ($f_t$) indicators indicating whether the response data to said exercise is correct or not, the $t_t$ or $f_t$ indicators subsequently being associated to said task or exercise and stored at said storage space, and
  selecting at least one subsequent exercise based on said $t_t$ or $f_t$ indicators.

In one embodiment, the exercises within said at least one task are adapted to the individual users with variable time intervals bases on said $t_t$ or $f_t$ indicators.

In one embodiment, said at least one task is selected from:
  a pronunciation task and where said task specific exercises include playing at least one learning related data where said pre-determined interval has been reached to the user and where the user repeats the pronunciation of said learning related data, said language learning system further comprising a speech recognition system for processing the pronunciation from the user so as to determine if the pronunciation is correct or not, where in case the pronunciation is correct a $t_t$ indicator is associated the word, or
  listening where the exercises include playing a sound file displaying a sentence to the user comprising at least one word where said pre-defined time interval limit has been reached in the sentence(s) is blank, where the said input means is a key or touch button command where the user replies to the missing word in the blank, the input subsequently being processed and compared with a reference relating data where in case the reply matches with the missing word a $t_t$ indicator is associated to said task, or
  reading task where the exercises include presenting the user with a paragraph including at least one learning related data where said pre-defined time limit has been reached,
  a writing task and where said exercises include that the user writes a sentence including at least one word where said pre-defined time interval has been reached, said sentence subsequently being processed and compared with a pre-stored reference sentences, and where $t_t$ or $f_t$ indicators are associated to said task depending on a match or non-match with said reference sentences, or
  a conversation task and where the exercises in the conversation task include initiating a conversation between the user and an instructor via a network, the instructor being provided with user specific information including information about pre-defined time interval limit has been reached, the subject of the conversation being selected such that it includes at least one learning related data where said pre-defined time interval limit has been reached, or
  a combination of one or more of the above mentioned tasks.

In one embodiment, the processor (P) is further adapted to monitor said $f_l$ indicators in said storage space and based thereon repetitively presenting learning related data having associated $f_l$ indicators to the user with user-specific time intervals until $t_l$ indicators are issued for the users response, the $t_l$ indicators subsequently being associated to said learning related data and said associated response data in said storage space, said step of presenting learning related data having associated $t_l$ indicator to the user with user-specific ascending memory time interval being repeated until a pre-defined time interval limit has been reached.

The present invention thus improves the learning mechanism by establishing a continuous and non stopping process that automatically measures the memory retention of each item learned. Thus being able to schedule optimal instances for reviews of each item learned and to master a never forget state of items learned. Furthermore the prior art methods do not organize and schedule more complex language learning tasks for each user based on the memory retention of each word learned, whereas the present invention accomplices this using a special process for this purpose, thus obtaining at individual level (a personalized) a more optimal language learning method than presented before.

Moreover, the system that has one continuous study process measuring and optimizing each item learned and further scheduling more advanced language learning tasks based on memory retention of each item/word studied. Thus, advancing and optimizing the whole language learning process beyond what has been done to the present.

Said language learning system may of course be implemented for all language pairs. Also, said task should not be construed as being limited to the above mentioned embodiments. On the contrary further tasks could be defined and for different language pairs, the sequence for exercising these tasks could be different.

The system is thus capable of selecting various types of tasks, e.g. choose a sound file that may include a sentence, paragraph, short story, etc., where while listening, the user can also read the text that is being played. By letting the user e.g. write the entries in the blanks that are in "focus", i.e. entries where said pre-defined time interval limit has been reached, and possibly some other entries as well while listening the system can judge if the user was able to grasp the correct listening or not. Therefore, the language learning will further be improved and adapted for each individual user.

Said sound files in the listening tasks is preferably chosen by using similar logic as selecting the "best" example sentence as discussed later, i.e. based on what the system thinks that the user is prepared to listen to. This is based on the user data history stored at said storage space that is associated to the user where said associated time intervals may be used for selecting the most appropriate sentence to be played for the user. This listening material may be longer than just a sentence, e.g. news, short story, long dialogues etc., where the selection is based on what the system considers as being most suitable for the user. This could be today's news story on the Japan earthquake where the system deems that the user is ready to read or listen to the story. Another story, e.g. today's story on Libya, may be considered as not being ready for the user to be read or listen to since the user still doesn't know X number of entries found in the news story and Y number of entries, which are known to the user, still need to be brought to a Z day spaced interval so that the user is able to make sense out of them in reading or listening.

In a second aspect of the invention, a method of personalizing language learning to individual users, comprising:
generating and presenting learning related data to a user associated with a user ID,
receiving, in response to said learning related data, response data from the user indicating the users response to said learning related data,
associating said learning related data to said response data so as to couple the response from the user to said learning related data, and
storing said learning related and said associated response data in a database including a storage space associated to the user ID so as to generate an individualized language knowledge database for the user,
wherein the method further comprises:
issuing a true ($t_I$) or false ($f_I$) learning related data indicators indicating whether the response data matches the learning related data presented to the user, the $t_I$ or $f_I$ indicators subsequently being associated to said learning related data and stored at said storage space,
monitoring said $t_I$ indicators in said storage space and based thereon repetitively presenting learning related data having associated $t_I$ indicator to the user with user-specific ascending memory spaced interval which is registered and associated to the learning related data until a pre-defined time interval limit has been reached, and based thereon select at least one task to be presented to the user by said output means,
where within said at least one task plurality of task specific exercises each of which includes at least one learning related data where said pre-defined interval has been reached are presented to the user with task time ascending intervals in case user's reply to previous task specific exercises is correct or satisfactory.

In a third aspect of the invention a computer program is provided comprising instructions for carrying out all the above mentioned steps when said computer program is executed on a computer system.

In a forth aspect of the invention a computer program product is provided computer program product tangibly embodied on a computer-readable medium and including executable code that, when executed, is configured to cause one or more processors of a computing device to:
generate and present learning related data to a user associated with a user ID,
receive, in response to said learning related data, response data from the user indicating the users response to said learning related data,
associate said learning related data to said response data so as to couple the response from the user to said learning related data,
store said learning related and said associated response data in a database including a storage space associated to the user ID so as to generate an individualized language knowledge database for the user,
issue a true ($t_I$) or false ($f_I$) learning related data indicators indicating whether the response data matches the learning related data presented to the user, the $t_I$ or $f_I$ indicators subsequently being associated to said learning related data and stored at said storage space,
monitor said $t_I$ indicators in said storage space and based thereon repetitively presenting learning related data having associated $t_I$ indicator to the user with user-specific ascending memory spaced interval which is registered and associated to the learning related data until a pre-defined time interval limit has been reached, and based thereon select at least one task to be presented to the user by said output means,
where within said at least one task plurality of task specific exercises each of which includes at least one learning related data where said pre-defined interval has been reached are presented to the user with task time ascending intervals in case user's reply to previous task specific exercises is correct or satisfactory.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

The present invention relates to a language learning system and a method where the language learning is personalized for individualized users. The method/system may be divided into three main steps:

1. Memory step: Here the user is presented with learning related data which may e.g. be flashcard of a word in focus that is displayed to the user. This flashcard is presented to the user with time ascending time interval if the user answered the previous flashcard correctly. In the following this time ascending interval will be referred to as a memory spaced interval.

2. Task: When the word in focus is "deep enough" in the user's memory, a first task selected from plurality of tasks is selected for the user. Within each task the user is presented multiple of task specific exercises. This means that each task has its own exercises that are specific for each task and each of the exercises are spaced according to a task forgetting curve for this specific task. The task forgetting curves for different tasks are independent from each other and are preferably based on empirical research or methods as is described later.

Figure 20:
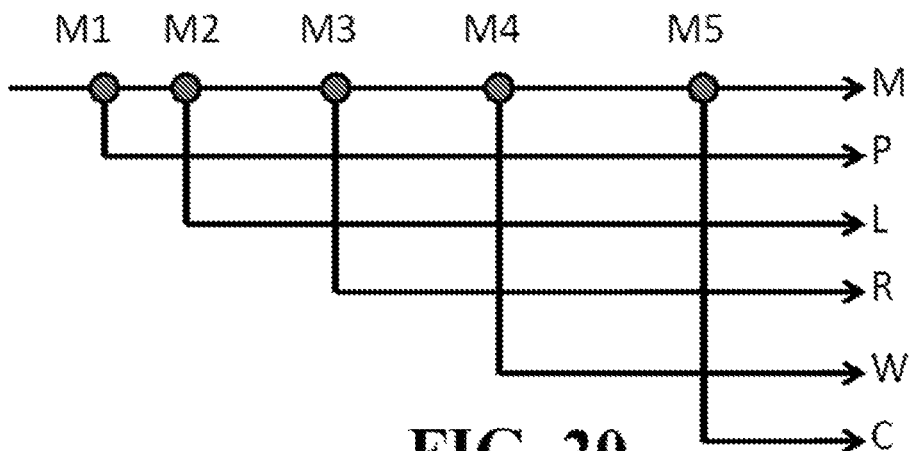
FIG. 20 shows several parallel running task process and task milestones for an item.

This first task runs independent from the memory step procedure meaning that while the task exercises are presented to the user, the flash card procedure is still running simultaneously. Subsequent task(s) are added to the running task and running memory procedure when its optimal for the user to start performing this new task. Lets say that the first task is a pronunciation task and a second task is a listening task, and the word in focus is "pilot", when the memory depth of the word has reached a second milestone, which determines when the second task should be started, the listening task for the word pilot is started. At this time point, there are three procedures running simultaneous, the memory procedure, the first task procedure and the second task procedure. Additional task may then further be added as an additional parallel procedure to the above mentioned running procedures based on third, fourth etc. milestones. This is shown graphically in FIG. 20, where "M" stands for memory retention process (flash cards are presented), "P" stands for pronunciation task, "L" for listening task, "R" for reading task, "W" for writing task and "C" for conversation task. Points M1-M5 stand for different task milestones, M1 is the first task milestone, M2 the second etc.

The task milestones are found by empirical methods determining when it is optimal to present a certain task for a given item to a user, based on the user's memory retention of that given item in order to advance the user's ability to master a particular language.

Figure 1:
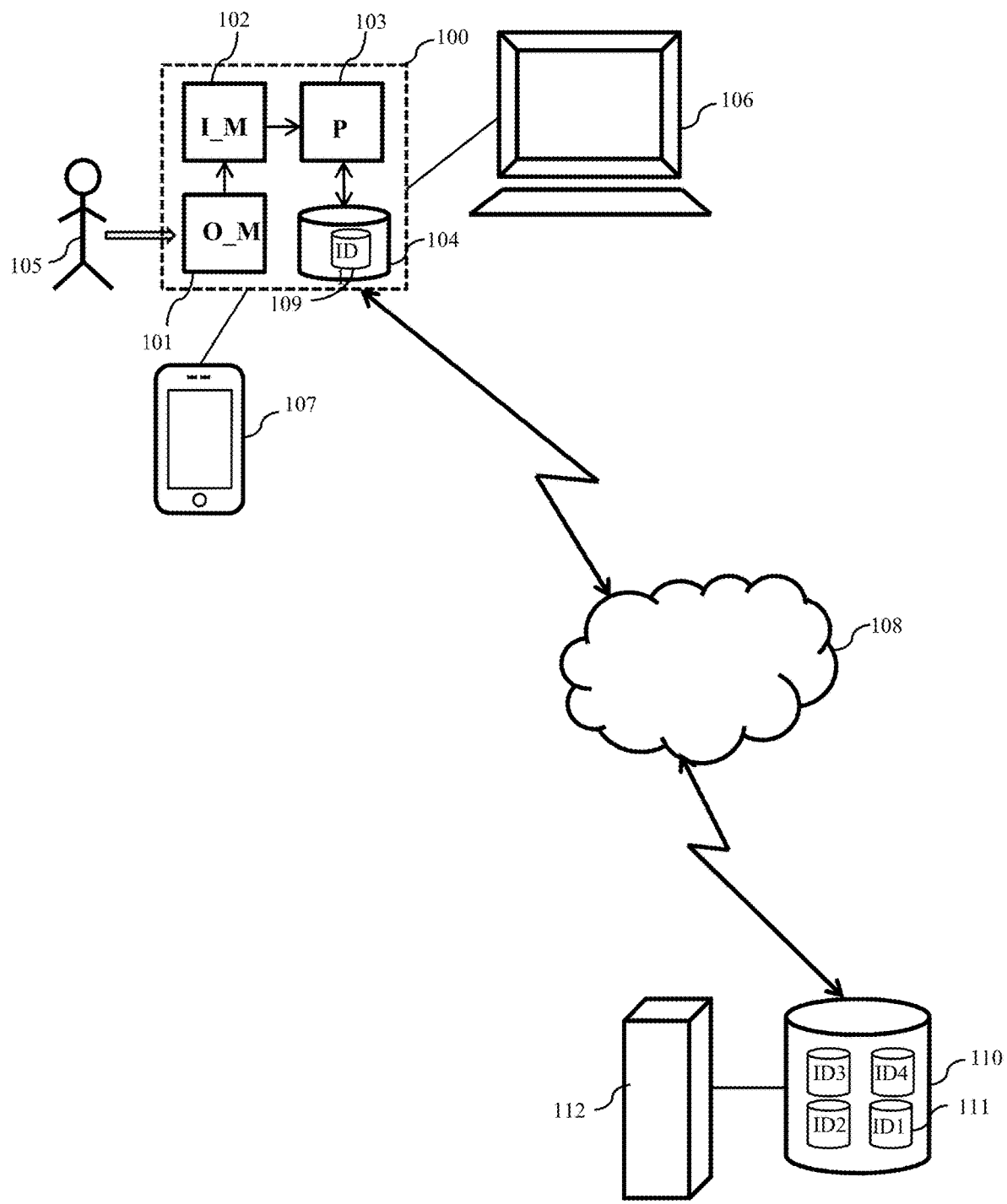
FIG. 1 depicts graphically a language learning system according to the present invention adapted to personalize language learning to individual users.

FIG. 1 depicts graphically a language learning system 100 according to the present invention adapted to personalize language learning to individual users 105 comprising an output means (O_M) 101, an input means (I_M) 102, a processor (P) 103 and a database 104.

The output means (O_M) 101 is adapted to generate and present learning related data to a user 105 where the user is associated with a user ID, which may e.g. be username and/or password or data that uniquely identify the user. The output means (O_M) 101 may as an example be, but not limited to, a display that displays the learning related data to the user, or a speaker that plays the learning related data via speech.

The input means (I_M) 102 is adapted to receive, in response to the learning related data, response data from the user indicating the user's 105 response to the learning related data. The input means (I_M) 102 may as an example be, but is not limited to, a keyboard or touch-board mechanism where the user 105 can type his/her response data, a mouse where via selecting an appropriate icon/flashcard being displayed on said display, a speech recognition system where the user 105 can via speech indicate his/her response to the learning related data.

The processor (P) 103 is adapted to associate the learning related data to the response data from the user 105 and subsequently store these data in the database 104, which includes a storage space 109 associated to the user ID. In that way, an individualized language database is generated for this specific user 105. The processor (P) 103 is further adapted to: i) issue true ($t_l$) or false ($f_l$) indicators indicating whether the response data matches the learning related data. Issuing such a $t_l$ or $f_l$ may, as will be discussed in more details later, be done by the user by simply clicking on a right or wrong icon, i.e. the user himself may be the one that tells whether or not the answer is correct or not. The $t_l$ or $f_l$ indicators are associated to the learning related data and stored in the storage space. ii) Monitor the $t_l$ indicators in the storage space 109 and based thereon repetitively presenting learning related data having associated $t_l$ indicator to the user with user-specific memory spaced ascending time intervals which is registered and associated to the learning related data until a pre-defined time interval limit has been reached, which may referred to as a first task milestone based on empirical method for the first task. Generally speaking, both the $t_l$ and $f_l$ indicators are monitored and stored so as to store as many information from the user as possible and therefore make a better and more personalized system. Other types of information that may be stored can be, but is not limited to, if a user hovers over an example sentence to get information on a certain entry in the example sentence, ask for a translation of the example sentence, hover over a kanji symbol to get more information on that kanji symbol, get information (pronunciation, reading, etc.) on a word that is not in focus when in pronunciation mode, etc. Therefore the system gets hints if the user has possibly trouble with certain things by automatically investigating the user's behavior. The processor (P) 103 is further adapted to iii) monitor the number of learning related data where the pre-defined time interval limit has been reached and based thereon select a task to be presented to the user by the output means.

The task may be formed by one or more learning related data including at least one learning related data where the pre-defined time interval limit has been reached. The processor may carry out a further step iv), namely to select the task in accordance to a set of rules including selecting at least one of the remaining learning related data in the task in accordance to the associated time intervals so as to optimize and individualize the task to the user. The different tasks present in a way multiple learning levels where each level presents one type of exercise, e.g. pronunciation exercise of a single word, wherein within this pronunciation level ascending time intervals are implemented if the user answers correctly or good enough. Lets say that the pronunciation from the user of a given word is rated as acceptable using e.g. a recognition system that rates the quality of the pronunciation from the user, a $t_l$ indicator is associated to this pronunciation if the users performance was acceptable.

Accordingly, this first task is presented to the user with multiple of exercises having ascending time intervals (in case the user answers correctly) spaced based on a first task forgetting curve. In case the user's response to previous exercise has an associated true task exercise indicator ($t_v$). If the answer is incorrect a false task indicator ($t_f$) is associated to the task. The task forgetting curve is calculated based on an empirical study for each task. The curve is a function of coefficients that may include but not necessary limited to c_item_group(task), c_group(task), c_item(task) and c_person(task). These aforementioned coefficients are explained in the list below:

- c_item_group(task) represents the coefficient for that item based on a group of users. For example this coefficient for that item for the pronunciation task might be low if the selected group of users have in general had hard time when pronouncing that particular item and therefore in general got a low score when pronouncing that item.
- c_group(task) represents the coefficient for that task based on a group of users. For example this coefficient might be low for the pronunciation task if the selected group of users have in general had hard time when pronouncing a group of items and therefore got a low score when pronunciation those group of items.
- c_item(task) represents the coefficient for that item for that person for that particular task. For example this coefficient for an item for the pronunciation task might be low for the user if the user has often had hard time repeat a pronunciation exercise for that particular item and therefore has got a low score in a pronunciation exercise for the item. The starting value for a new user for this particular coefficient might be the value of the c_item_group(task).
- c_person(task) represents the coefficient for the person for that particular task. For example this coefficient for pronunciation might be high for the user if the user often gets high score when exercising pronunciation.

A similar set of coefficients may as well be used to calculate the forgetting curve for the flashcards. These coefficients may be different for each language pair.

When the word has been further spaced into memory via the flash card process a second task milestone is reached based on empirical method/process of the second task. This procedure is the repeated for multiple of exercises for this second task, which again are individually spaced based on the second task forgetting curve.

This may then be repeated for third, forth etc. task where the multiple of exercises within each task are spaced based on the third, forth etc. forgetting curves. The ascending time intervals between the exercises within the same task are preferable individualized for each individual user. Further, the ascending time intervals within different task may be different because the user may e.g. be stronger in the pronunciation task than in the listening task. Accordingly, the system is capable of, based on the user's history, to customize the task to the user.

Referring to the flash card procedure, in one embodiment, the processor (P) carries out a further step v), namely to monitor the $f_l$ indicators in the storage space and based thereon repetitively presenting learning related having associated $f_l$ indicators to the user with user-specific time intervals until t indicators are issued for the user's 105 response. These $t_l$ indicators are then subsequently associated to the learning related data and the associated response data in the storage space 109. The processor then repeats step i)-iv) as discussed above.

Steps i)-v) will be discussed in a more detailed way in relation to the flowchart in FIG. 2.

In one embodiment, the language learning system 100 is comprised in a regular computer device 106 (e.g. PC or laptop computer) comprising said output and input means 101, 102 and said processor 103. The database 104 may either be located at the computer device side 106, or it may be an external database 110 that hosts such data for thousands of users each being associated with storage space 111 with different user IDs. In this case the communication between the computer 106 and the database 110 occurs via a communication channel 108 which may be publicly or privately accessed network (wired or wireless) such as the Internet or a mobile network such as 3G. The processor (P) 103 may also be a remote processor comprised in an external computer or a server 112 that operates the external database 110.

In another embodiment, the language learning system 100 is comprised in a portable device 107 such as mobile phone, a tablet computer, and the like that is capable of communicating via said communication channel 108 to the storage space 111 in the external database 110. The processor may either be provided at the mobile device side, or at said external computer/server 112.

Figure 2:
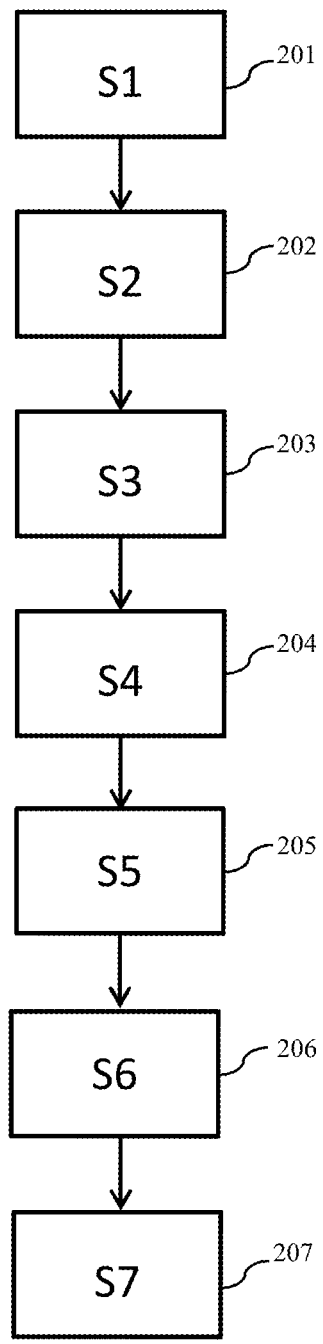
FIG. 2 shows a flowchart of a method according to the present invention for personalizing language learning to individual users.

FIG. 2 shows a flowchart of a method according to the present invention for personalizing language learning to individual users.

In step (S1) 201, learning related data are generated and presented to a user associated with a user ID. This may as an example include displaying visually a flashcard to the user, e.g. be a Japanese entry "tomodachi" that is displayed on e.g. the user's computer screen or the mobile phone screen. The learning related data that are presented by the user are in one embodiment data that the user has pre-selected in e.g. a pre-selection mode where the user selects several words of interest. If as an example the user is an English native speaking pilot that is moving to Japan and he/she want to learn Japanese, the user can start by entering several words that have something to do with being a pilot, e.g. an aircraft, captain, stewardess etc. plus some general words such as "friend". By doing so, the system automatically generates several flashcards with these pre-selected words where on "one side" the Japanese words is given and "on the other side" the English translation. By doing so the user himself can decide how to place the emphasis on, i.e. in this case on words relating to flight. Accordingly, the user generates his/her own direction in the language learning.

In another embodiment, the user can indicate that he/she want to start with general beginner course. In such case, the system will automatically select which flashcards are most suitable for the user.

In step (S2) 202, response data are received from the user in response to this learning related data indicating the user's response. In an embodiment and referring to the example in S1, this works in a way that the user takes some time to think about what the answer is to "tomodachi" and then requests the answer to be shown by e.g. clicking on "show correct answer" icon on a display. If the answer that is shown matches the answer that he/she thought that was the right answer the response data received from the user is simply input data saying whether this answer being shown matches the user's answer. This may e.g. be done by clicking on a "right" or "wrong" button displayed with the flashcard.

In step (S3) 203, the user's response data, i.e. provided by clicking said "right" or "wrong" button, displayed with the flashcard.

In step (S4) 204, the learning related data and the associated response data is stored in a database including a storage space associated to the user ID so as to generate an individualized language knowledge database for the user. As discussed in relation to FIG. 1, this database can be an external database that is operated by an external server, or be a local database comprised in e.g. a PC computer or a portable device.

In step (S5) 205, a true ($t_l$) or false ($f_l$) indicators are issued indicating whether the response data matches the learning related data presented to the user. These indicators are subsequently associated to the learning related data and stored at the storage space. Referring to the example above if the user thought that the answer to the Japanese entry "tomodachi" is "friend", and the correct entry that is displayed is "friend" the user selects said "right" flashcard and a $t_l$ indicator is issued and associate to this entry "tomodachi". Steps S1-S5 are repeated for a number of entries where such $t_l$ or $f_l$ indicators are issued and associated to learning related data and the response data and in that way a user specific database is built up that indicates the user's knowledge. Therefore it is possible to keep track of the user data history in said storage space, which becomes more detailed and gives a better insight into the user's improvements.

In step (S6) 206, the $t_l$ indicators are monitored and based thereon learning related data having associated $t_l$ indicator are repetitively presented to the user with said user-specific memory spaced interval which is registered and associated to the learning related data. Each time it is checked whether this memory spaced interval has reached a pre-defined time interval limit, or a first task milestone. This pre-defined time interval limit may vary from user to user and also be different depending on the difficulty level of the entry as an example. If this pre-defined time interval limit has not (N) yet been reached, step (S6) 206 is repeated but with increased time interval until this pre-defined time interval has been reached (Y).

In step (S7) 207, the number of learning related data are monitored where this pre-defined time interval limit has been reached and based thereon a task (pronunciation, listening, reading, writing, conversation, etc.) is selected for the user. Accordingly, at this level it is assumed that the user is ready to exercise the entry at a more advanced level.

It should be noted that at (S7) a first task is start parallel to the process described in (S1)-(S6), but this process proceeds continuously parallel to the task process (S7) and subsequent task process. This means that e.g. four task processes plus the flash card process are running simultaneously is parallel fashion.

In a preferred embodiment, the exercises within the task are formed by a one or more learning related data including at least one learning related data where the pre-defined time interval limit has been reached.

In one embodiment, the task is selected in accordance to a set of rules including selecting at least one of the remaining learning related data in the task in accordance to the associated user-specific time intervals so as to optimize and individualize the task to the user.

In one embodiment, the learning related data are selected from one or more entries and a sample sentence selected from sample sentences stored at the storage space is presented to the user.

In one embodiment, the task in (S7) may further include receiving a speech input from the user by reading a sentence including the word in focus, where the speech input is subsequently processed and compared with a pre-stored reference speech and based thereon the pronouncing from the user is rated.

In one embodiment, the learning related data are entries and a sound file is selected and played from sample sound files stored at said storage space via said output means.

In one embodiment, the learning related data are entries and the task is to select and play a sound file from sample sound files stored at the storage space and further to present the content of the sound file visually to the user as a sentence(s) such that at least one learning related data where the pre-defined time interval limit has been reached is presented in the sentence as a blank. In this embodiment, the task includes receiving input from the user so as to fill up in the blank and subsequently process and compare the received input with a reference learning relating data.

In one embodiment, the learning related data are grammar points and where the intent is to present grammar points in an example sentence(s) or speech. This may also be performed while presenting flashcard entry(ies). It is thus possible to knit grammar into this language learning.

In one embodiment, the learning related data are entries and the intent is to trigger a conversation between the user and an instructor. The conversation is preferably selected such that it includes at least one entry where the pre-defined time interval limit has been reached, i.e. a task milestone.

In one embodiment, the learning related data are one or more entrie(s)/sentence(s)/figure that are presented visually to the user and where the intent is to receive either an entry or a sentence(s), or a paragraph(s) as a response from the user including at least one entry where the pre-defined time interval limit has been reached, i.e. a task milestone. This may be done via keyboard commands or via speech.

Example for Sentence Selection:

Sentence B that includes w1 w2 w3 is chosen instead of sentence A, which includes w1 w4 w5, where w is an entry such as a single word. This sentence may be presented to the user visually (displayed on e.g. the computer screen) or via speech, or presented to the user for reading when exercising pronunciation. Both these sentences contain the entry w1, which is the entry in focus, i.e. the entry where the memory spaced interval has been reached. However, the system favors B over A because w2 and w3 have user-specific time-intervals that are more favorable then the memory spaced interval for w4 and w5. In that way, the information about the time intervals, which have not yet reached the pre-defined time interval, are being used as input data in selecting the most favorable sentence.

This sentence B may be selected out of potentially thousands or hundreds of thousands sample sentences stored at said database. This sentence B may also be considered as being the best example sentence to be used in e.g. i) paragraph etc. used to aid the user when reviewing a certain flashcard, ii) paragraph etc. presented when in pronunciation mode (speech recognition might be used here to correct the user but it is not necessary), iii) paragraph etc. used in listening mode, or iv) paragraph etc. used in reading mode. "flash card" process or in the "task" processes, e.g. pronunciation.

In one preferred embodiment, the method further comprises the step of monitoring the $f_l$ indicators in said storage space and based thereon repetitively presenting learning related data having associated $f_l$ indicators to the user with user-specific time intervals until $t_l$ indicator are issued for the user's response and subsequently associated to the learning related data and the associated response data in the storage space. This would typically be to start with descending time interval where the interval is systematically adjusted to the user by repetitively decrease this time interval for e.g. a specific entry which may be difficult for the user to remember until the user remembers it. Said steps (S1)-(S6) are then repeated.

FIG. 3-8 show a user being presented with a learning related data, i.e. the user is in the flash card process.

Figure 3:
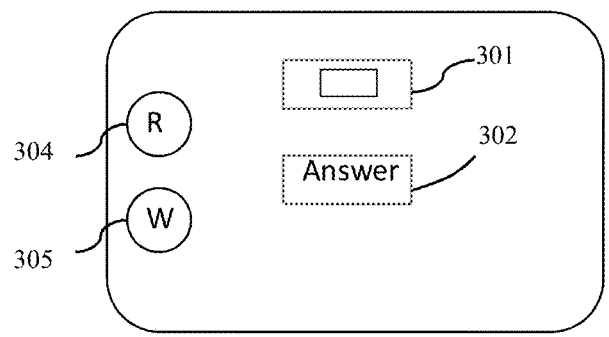
FIGS. 3-8 depict graphically scenario where the user is learning Icelandic from English.

FIG. 3 depicts graphically the scenario where an English native speaking user is learning Icelandic. Generally, when the user is starting a new language course, e.g. in Icelandic, he/she can select via appropriate selection function (not shown here) in what area/topic the user is interested in. Based thereon, the language learning system selects the learning program. As discussed in relation to FIG. 2, the user may also manually enter several entries of interest and based thereon the system automatically selects the language direction for this individual user. The language learning system may also via artificial intelligence find out in what area the user is interested in and based thereon selects the most suitable language learning program for the user.

Figure 4:
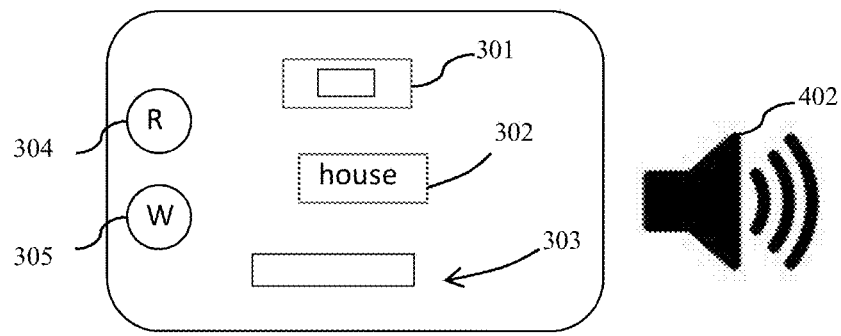

At the very beginning (not shown here) the user is presented with the learning related data, e.g. a word, and the answer and is asked to memorize. Referring to this example after this first step an Icelandic entry 301 is displayed via flashcard to the user. After some time of thinking the user comes up with the conclusion that this word stands for the word "house" in English. The user now pushes (e.g. via mouse click) the "Answer" 302 button to see the correct answer, which as depicted in FIG. 4, shows that the answer is indeed the word "house". The user can now indicate whether his/her answer was correct or not by selecting either one of right (R) 304 or wrong (W) 305 buttons. By selecting the "R" 304 button (e.g. via mouse click) the user indicates that his/her answer was correct. By doing so a $t_i$ indicator is issued, in other words a Boolean true state is set, e.g. by issuing a trap to the processing unit indicating that the user had the correct answer and this $t_i$ indicator is associated to the word "hits" and stored in the storage space associated to this user. The same applies when the user selects the (W) 305 button, where instead of right indicator a false ($f_i$) indicator is issued. Other scenarios are of course possible, such as by displaying via the flashcard several answer possibilities and let the user select out the answer for this flashcard.

This is continued for some number of entries to start with. After that, the time interval between repeating the question for this given entry is increased, from e.g. 5 minutes to 10 minutes, where after each time interval the user answers the question. This may be done for several parallel running entries. When this time interval, where the user still is answering the question correctly, has reached said pre-define time limit (a first task milestone), e.g. 20 minutes, the language learning system decides to move the learning for this specific entry to a more advanced level, namely to select a first task. The first task may be exercise the pronunciation of the word "house" by letting the user read the word aloud, in this case the word "hús". A speech recognition system may be provided for processing the speech from the user. The memory spaced interval may be from few minutes up to days or weeks, months or even more. The methodology within the different parallel running tasks has already been discussed in relation to FIGS. 1 and 2.

FIG. 4 depicts graphically the scenario from FIG. 3, where additionally, a sentence 303 has been selected from a large number of pre-stored sample sentences, which includes the entry "house" in an English sample sentence. In that way the user gets an opportunity to exercise this entry via this sentence in a more advance manner. As discussed previously, the selection of this particular sentence is carefully decided with the aim of selecting a sentence that is most suitable for the user at this specific time point. If w1="Þetta", w2="er" and w3="hús", where w3 is the entry in focus where said memory spaced interval has been reached, the remaining entries w1 and w2 are entries selected so as to optimize and individualize this process for to the user. These entries may e.g. be selected based on that the user has some pre-knowledge about these entries in relation to said user memory spaced time interval, or if the sentence is very complicated, based on that the user possesses good knowledge about these entries in relation to said user memory spaced time interval but has still not reached said pre-defined time limit. As an example, w1 may be an entry where the user memory spaced time interval is e.g. 8 days and w2 where the user memory spaced time interval is 2 days. Still, neither w1 nor w2 are entries where the pre-defined memory time interval limit has been reached, which could e.g. be 12 days for w1 and 3 days for w2. Accordingly, the user-specific memory intervals that are associated at all times to these entries are used as additional input data in selecting the optimal sample sentence for the user. This sample sentence 303 could also be played out aloud for the user via a speaker 402 at the same time. As discussed previously in relation to FIGS. 1 and 2, a speech recognition system could be provided to process the speech from the user so as to determine how good the pronunciation for the entry in focus w3 actually was.

Figure 5:
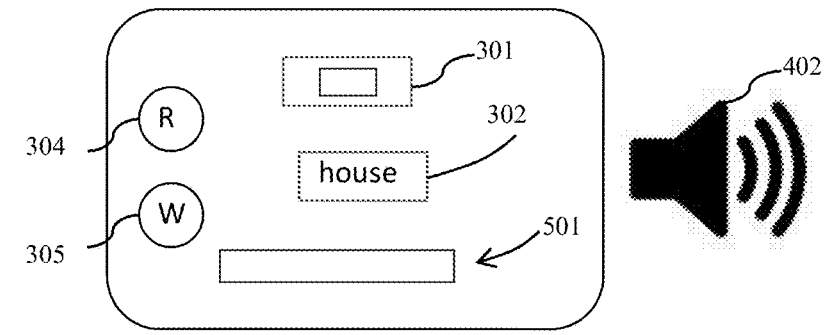

FIG. 5 depicts graphically the scenario from FIGS. 3 and 4 where additionally the grammar is being exercised, in this case the declination of the entry house in Icelandic is shown. Also, this could be played out aloud for the user.

In an embodiment, several grammar possibilities may also be displayed (not shown here) for the user via e.g. answers a) to d), each of which showing different solutions where only one is the correct one, where the user is supposed to select the answer that shows the correct declination of the entry "house" in Icelandic.

Figure 6:
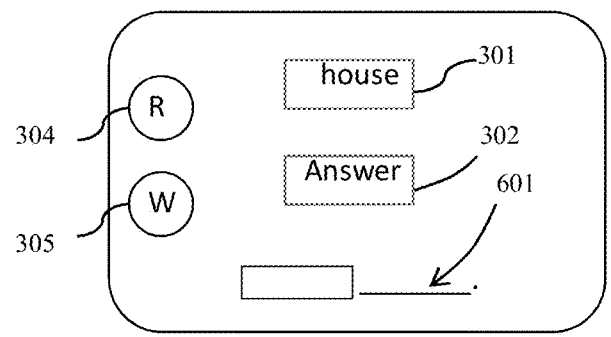
Figure 7:
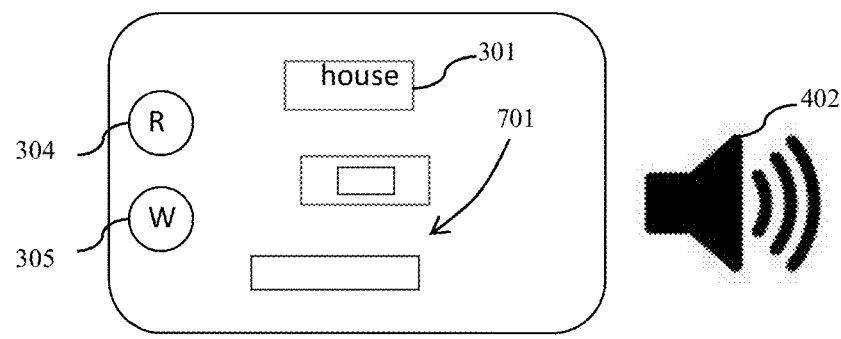
Figure 8:
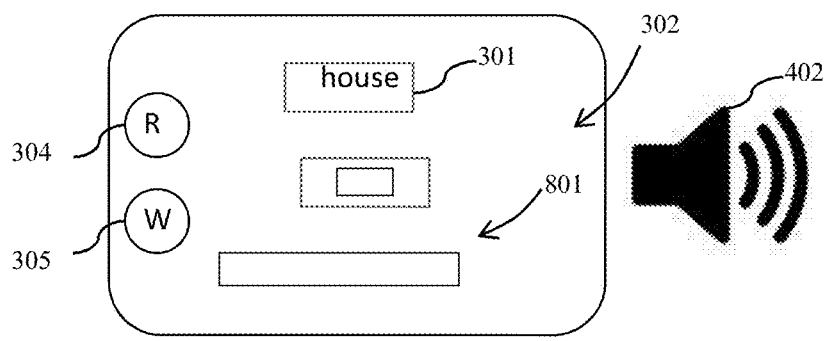

FIGS. 6-8 depict the scenario where the language learning is vice verse compared to FIGS. 3-5 for the same English native speaking user, i.e. the entry "house" is being exercised in the other direction, i.e. from an English entry to Icelandic entry.

FIG. 6 depicts additionally the scenario where the entry in focus is missing 601 in an Icelandic sentence. Again, the user now thinks about what the correct entry is and clicks the "Answer" 302 button to see the answer as shown in FIG. 7, and subsequently the right (R) 304 or wrong (W) 305 buttons to indicate whether the answer was correct or not. This scenario is actually identical to the scenario discussed in relation to FIGS. 3 and 4, but other way around.

The language learning preferably goes both ways, e.g. from English to Icelandic and Icelandic to English, although said user specific time intervals and said time interval limits may differ from each other for the same word but in different language.

FIG. 7 shows the scenario where a sample sentence 701 has been selected from a large number of pre-stored sample sentences, which includes the entry "hits" in an Icelandic sample sentence, and FIG. 8 depicts the scenario where the grammar is exercised via said sample sentence 801, in this case the declination of the word house. These sample sentences 701, 801 could also be played out loud for the user via a speaker 402.

Figure 9:
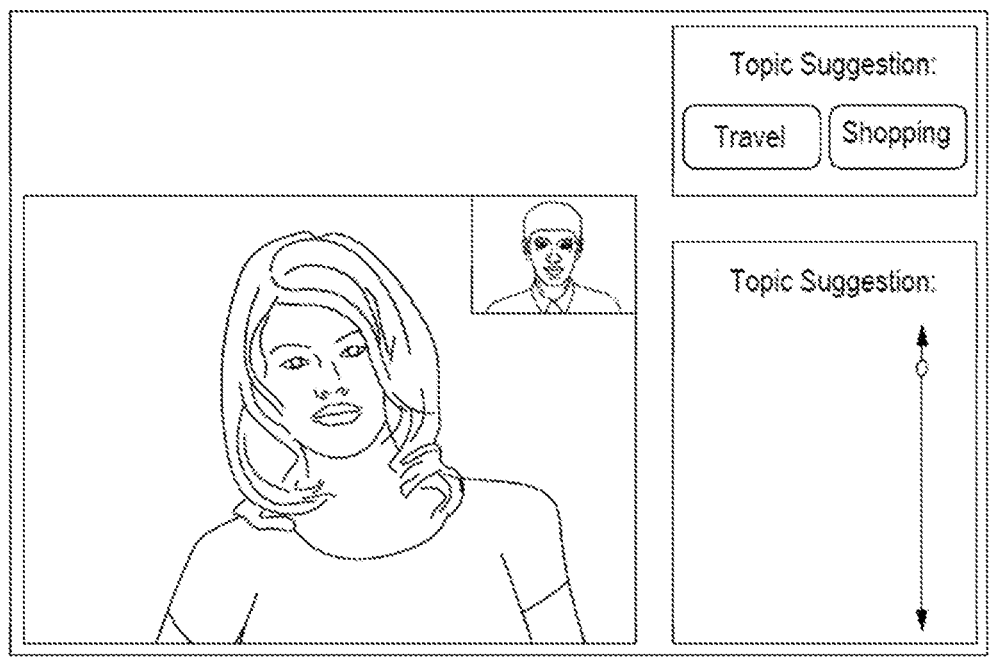
FIGS. 9 and 10 depict a scenario where a conversation between a user and an instructor has been initiated.
Figure 10:
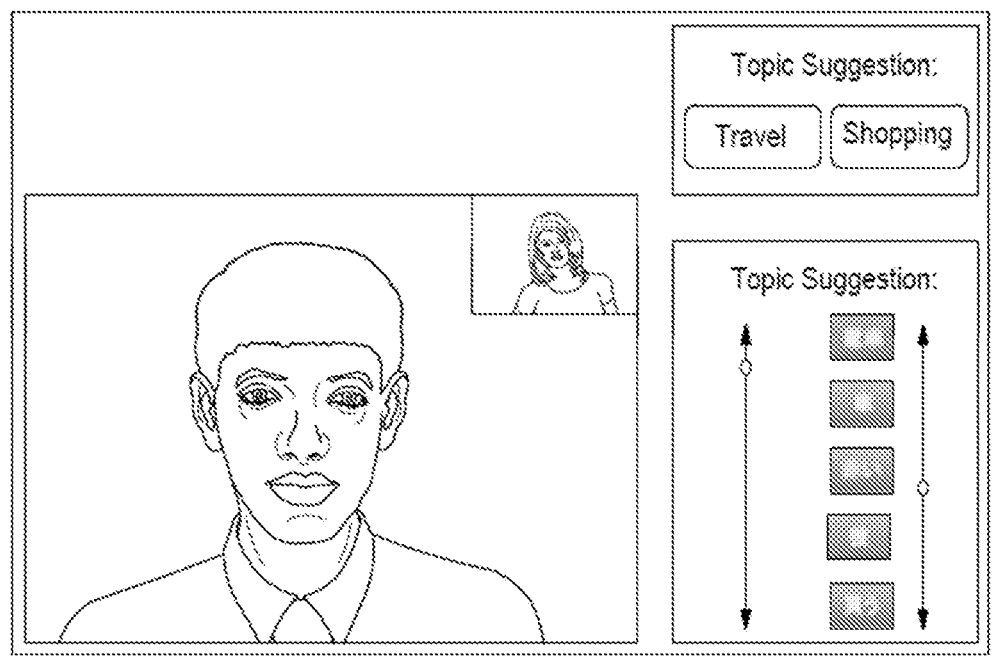

FIGS. 9 and 10 depict a scenario where a conversation task, which may be considered as being the highest task level, has been initiated between a user and an instructor, where FIG. 9 is seen from the user's view and FIG. 10 is seen from the instructor's view. In this case, the user that may e.g. be learning Japanese possesses sufficient knowledge to participate in such a conversation, which is organized so that the conversation includes at least one entry where the said pre-defined time interval limit (task milestone) has been reached. This entry may be visualized to the instructor who therefore knows which entries are "ready" for the student to use, i.e. have reached said pre-defined time limit, and based thereon tries to direct the conversation towards a topic that includes this word. By doing so a spontaneous usage of the entry will be exercised with the aim of training the user to use this entry spontaneously without even noticing it. The instructor marks the entry as "accomplished" only when the user has used the entry correctly in the conversation. The user can see entries that have been marked accomplished in the user interface.

Figure 11:
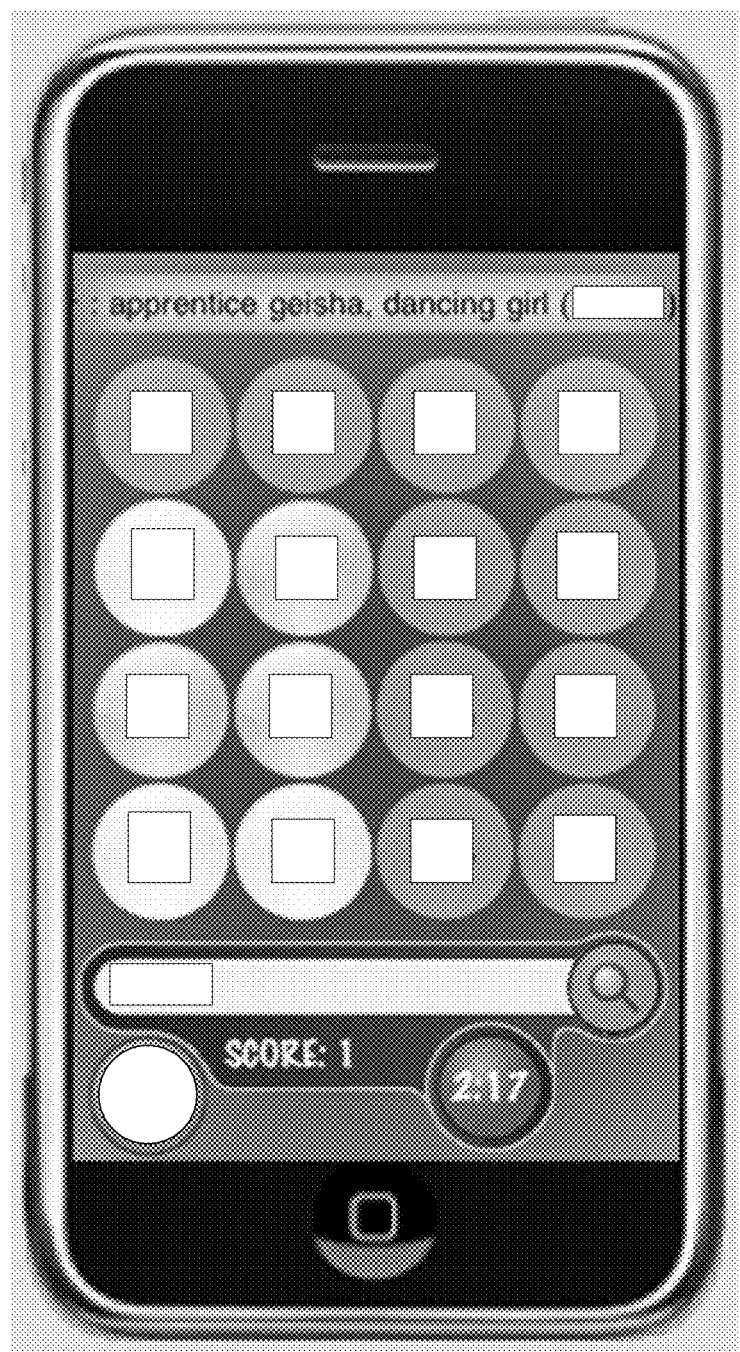
FIG. 11 depicts one embodiment of the language learning system according to the present invention, where part of the system is implemented as a computer game.

FIG. 11 depicts one embodiment of the language learning system according to the present invention, where a part of the system is implemented as a computer game or as an "app" that may be downloaded from e.g. the internet. In this game randomly organized letters are presented to the user as shown here in a manner that is personalized for this user, where these letters are pre-selected in a way that they can form an entry that the user has just learned or entries that have pre-time interval time limit that has been reached (i.e. a task milestone) that the system deems are useful for the user to exercise in the game. One way of doing so is to construct a puzzle from entries that are still not forgotten (time limit has not been over passed for the word).

If the user has two entries that the system deems are useful to be used in the game, e.g. the entry "car" and "law", then the letters being displayed on e.g. the computer/mobile phone screen are selected such that they include letters that can form the entry "car" and/or "law" and even other types of entries that are not in focus. If the user finds such entries he/she get points. As shown here below, this could be visualized for the user in the following way:

c a w
s a r
l v r

The aim of the game is thus to check if the user can find out the word "car" by pressing with his finger on "c", then "a", then "r". By doing so he/she gets certain number of points. The same applies for the entry "l", "a" and "w", i.e. law. The user would then get more points. The entry may be highlighted for a second and then the user gets his bonus points since he/she found an entry that are in focus of the game. If the user is able to detect a word the game may notify the system, that may affect either the user history for memory retention and its coefficients and or update one or more of the task intervals and task coefficients for that particular word.

Figure 12:
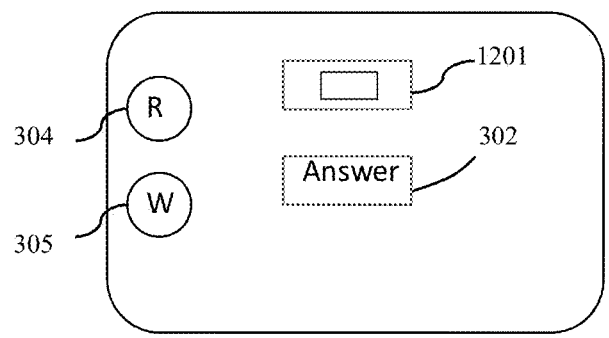
FIGS. 12 and 13 depict an example where a user is learning Japanese using an easy flashcard level.
Figure 13:
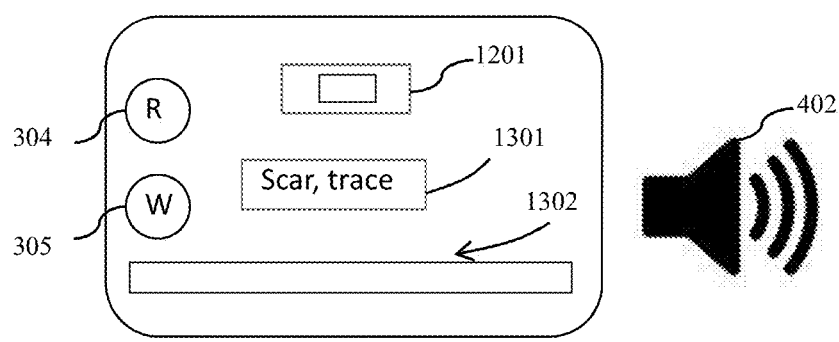

FIGS. 12 and 13 depict an example where a user is learning Japanese using an easy flashcard level.

In this scenario, the language learning system does not start with displaying complicated signs, but instead displays these entries with his/her letter system. In FIG. 12 the Japanese entry "ato" 1201 is shown in a first step. After some time of thinking the user clicks on the "Answer" button 302 resulting in that the meaning of this entry is shown in English, i.e. "scar" or "trace" 1301 in FIG. 13. As discussed previously in relation to FIGS. 3-8 the user now clicks on the right (R) 304 or wrong (W) 305 buttons depending on whether his/her answer was correct or not triggering said $t_l$ or $f_l$ indicators. FIG. 13 depicts also the scenario where the word "ato" is being used in a sentence 1302. As discussed previously, the remaining entries in this sentence would be carefully selected so as to find the most optimal sentence from e.g. thousands of sample sentences for the user.

Figure 14:
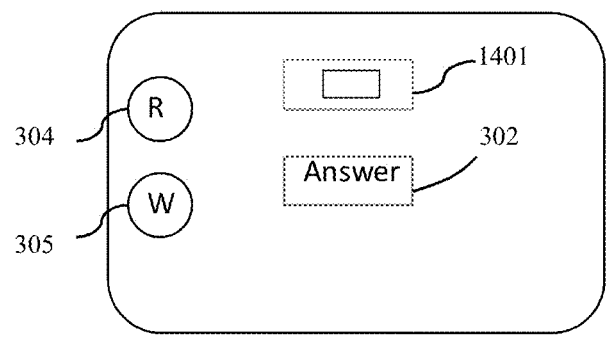
FIG. 14-15 shows a flashcard example where the flashcard level is more advanced than in FIGS. 12 and 13 since now the flashcard uses Japanese hiragana or katakana characters.
Figure 15:
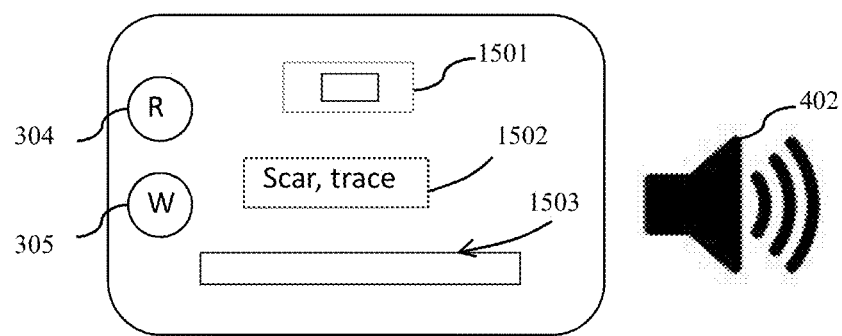

FIG. 14 shows an embodiment where a more advanced level of the flashcard described in FIG. 12 and FIG. 13. As shown here, the Japanese あと, hiragana version of the word "ato", 1401 is exercised. After some time of thinking, the user clicks on the "Answer button" 302 to see the right answer 1502, which in this case is the word "scar" or "trace" 1502. FIG. 15 shows also where this entry is being used in sample sentence 1503 selected in a way as discussed previously, where this sample sentence may additionally be played out aloud for the user via said speaker 402.

Figure 16:
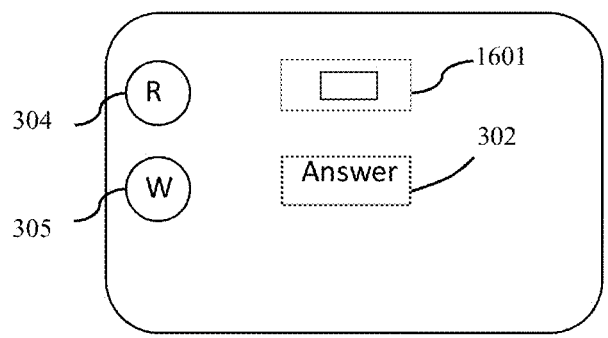
FIG. 16-17 depicts the scenario where the flashcard level is more advanced then in FIGS. 14 and 15 since now the flashcard uses Japanese kanji symbols or a mixture of kanji symbols and hiragana characters.

FIG. 16 depicts the scenario for a more advanced level of the flashcard then described in FIG. 14 and FIG. 15. In this scenario the entry is displayed with Japanese kanji symbol. The entry may include more than one kanji symbol or a mixture of kanji symbols and hiragana symbols. In this case, the kanji symbol 跡 is being used instead of あと. The transfer from said Japanese letters in FIGS. 14-15 to this Japanese sign "mode" may e.g. be initiated via simple selection mode by e.g. pressing an appropriate button inicating that the user wants to move to a more advanced level. By doing so the flashcard is "upgraded" and put to a more advanced level with more complicated Japanese signs. Again, after some time of thinking the user clicks on the "Answer" button 302 resulting in that the meaning of this entry is shown.

Figure 17:
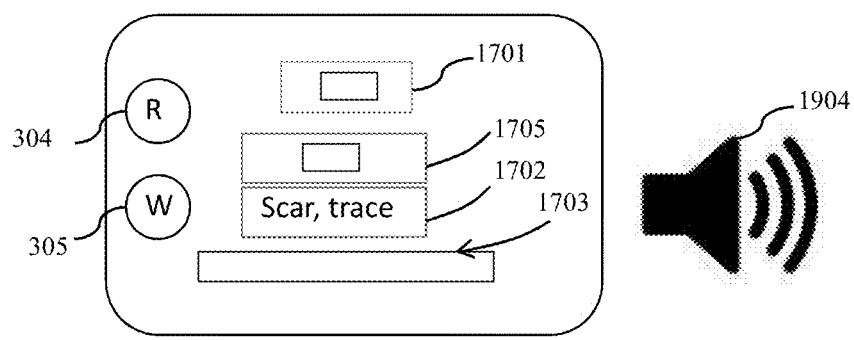

FIG. 17 shows the answer both via the simple Japanese hiragana symbols 1705 and more complicated kanji symbols 1701 as well as the English meaning of this entry 1702. Again, the user can via said right (R) 304 and wrong (W) 305 buttons indicated whether the answer was correct or not. Accordingly, in this figure a kind of a two step approach is initiated, namely to show the sign 跡 both as Japanese letters as well as the meaning in English. Shown is also a sample sentence 1703 selected as discussed previously.

It should be noted that the user can at any time "downgrade" the flashcards and go back to the easier level with only the Japanese letters as shown in FIGS. 14 and 15. The sample sentence or the entries may additionally be read out aloud via said speaker 402.

Figure 18:
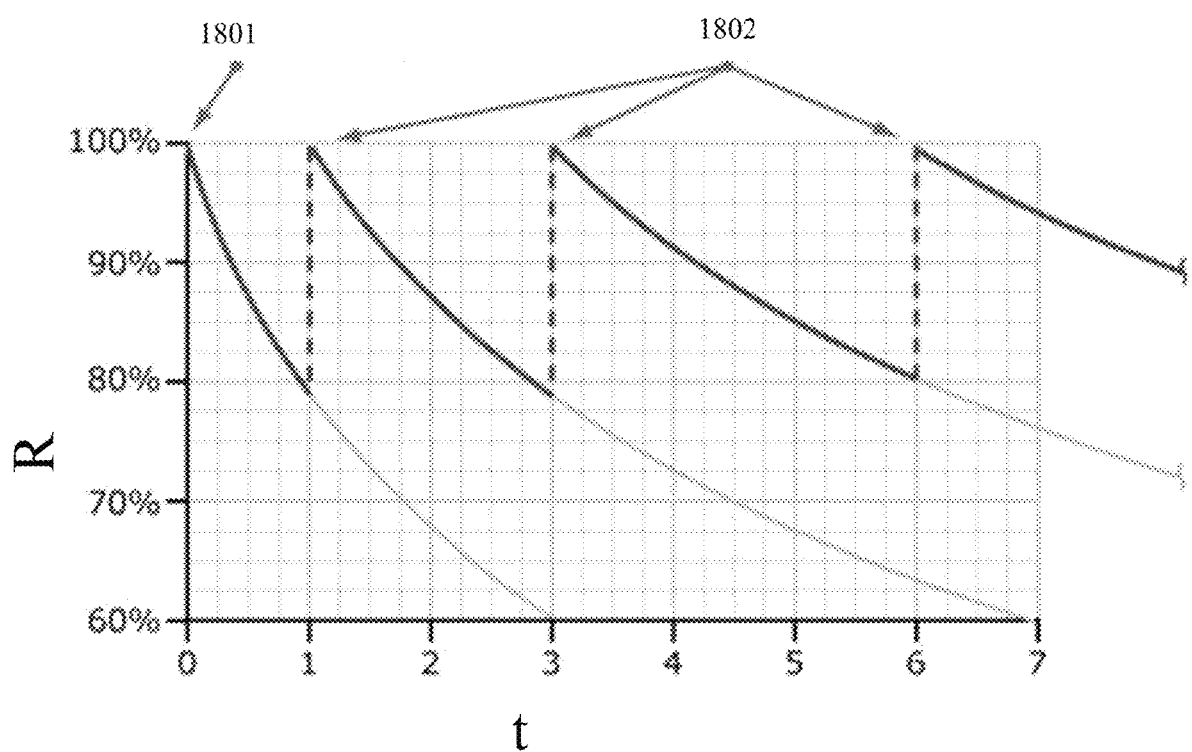
FIG. 18 depicts so-called forgetting curve.

FIG. 18 depicts an example of so-called forgetting curve for newly learned information, where the horizontal axis is time t and the vertical axis is the retention R in percentage. This figure may also be understood as showing how entries travel deeper into memory as a function of time.

The first learned entry 1801 is shown and the curve over the time interval 0-1 depicts how fast the user forgets this entry. For simplicity, assume that one unit in time is one day (could just as well be e.g. 5 minutes). Then, after one day it is according to this figure 80% likelyhood that the user remember this word. The next day, this same entry is reviewed (first review) the time until this retention falls down to 80% is two units in time, i.e. from 1-3, and a second review the time until the retention falls down to 80% is three units in time, or from 3-6. As an example to explain time interval (deep in memory) then it is 2 units deep at t=1.

This figure depicts graphically the principle of said user-specific ascending memory time intervals, where the memory time interval is continuously increased so as to store the entries deeper in the brain. After some given time, the time interval (i.e. units of time) gets so long and the slope of the curve approaches a flat line that one can say that word is stored for years or decades (until the retention falls down to 80%).

In a preferred embodiment, the present invention aims at finding the optimal percentage, which can be, but is not limited to, 80% percentage mark for each flashcard for each individual user in order to minimize the time that the user spends on reviewing flashcards. The aim is also to try to find the optimal time-limit for each task, i.e. pronunciation, listening, reading, writing, conversation, etc. for each entry in order to optimize the learning speed and therefore minimize the time needed to gain proficiency.

Figure 19:
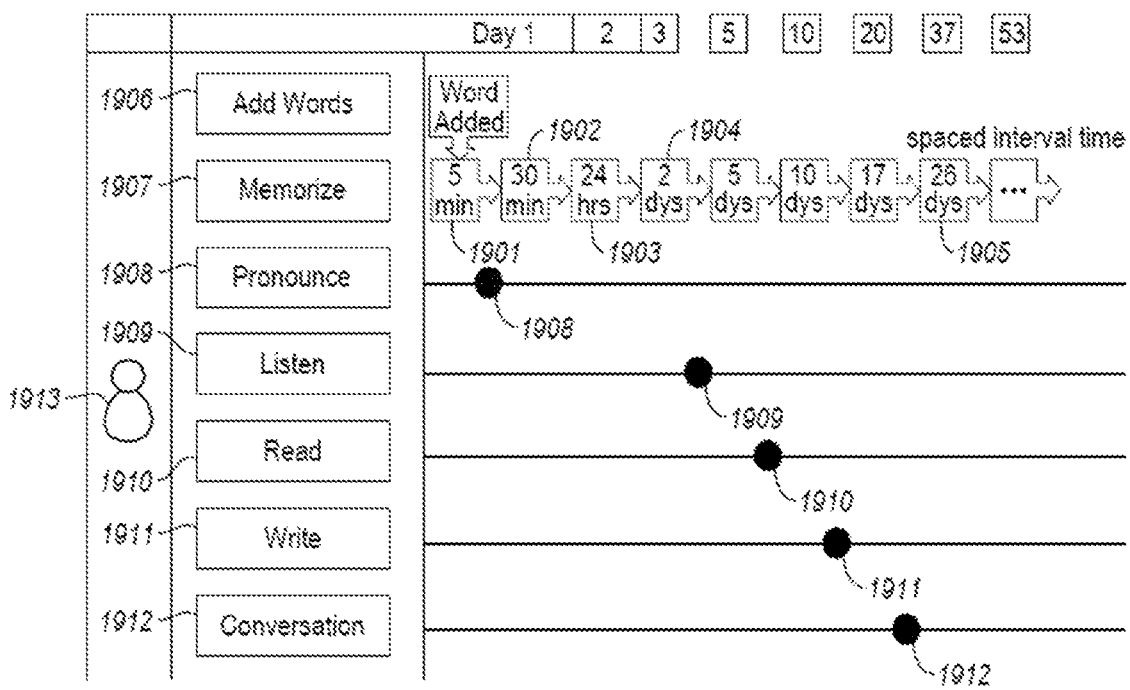
FIG. 19 depicts the general principle of the present invention.

FIG. 19 depicts the general principle of the present invention, where the upper horizontal axis stands for user-specific ascending memory spaced intervals 1901-1905 which is a non-linear timeline (or spaced interval time) and the vertical axis on the left side depicts the user interface 1906-1912. It should be noted that this figure applies for one user, but this figure is different between different users.

The user 1913 may at the very beginning select "Add words" function 1906 where he/she can start with entering several words within his/her interest. Referring to the previous example, assuming the user is a pilot and is moving to Japan for some time, he/she would like to increase his/her knowledge in words that have something to do with being a pilot. By entering words like "aircraft", "captain", "sky", "speed" etc., the system automatically generates flashcards for these words. The system may also suggest words to the user based on the words that the user and possibly other users have searched and added to their databases.

On the first day in the flash card process, the first memory spaced interval 1901 spans five minutes, i.e. 5 minutes pass from where the user is shown a given entry in Japanese for the first time until the entry is repeated. This interval is now increased up to 30 minutes 1902, i.e. it is now checked whether 30 minutes can pass and the user still remembers this entry. It should be noted that several entries could be shown parallel to this given entry. Each time the user marks right or wrong indicating whether he/she had the word right or not, and each time said $t_l$ or $f_l$ indicators are issued and associated to the entries. As shown in this example, if the user remembers the entry, the third memory spaced interval 1903 will be 24 hours and the fourth memory spaced interval 1904 2 days. Within these four time intervals 1901-1904 the pronunciation task is being exercised parallel to the flashcard process for each item. For this given user, the system may decide that said pre-defined time limit is two days for a listening task 1909 milestone, which may activate a listening task.

Since this entry has now reached the pre-defined time limit of two days, but this time may vary between different users or different entries, an additional task is presented to the user 1913, which in this example is listening 1909, and is run parallel to the other task. As discussed previously, a sentence may be selected from thousands of sample sentences where this entry, i.e. "aircraft" is included. The selection of such a sample sentence has already been discussed in relation to FIGS. 2-5.

As discussed previously, within each task there are task-specific exercises each of which have their own time task ascending intervals based on the task forgetting curves.

In one embodiment, such as listening may also be presented with said user-specific ascending exercised time interval or, if the user has suddenly forgotten the entry in focus, to descend the exercise time interval. In that way, time exercise intervals, either increasing or decreasing, may be utilized during the listening task. Let's say that the user has in this listening task forgotten the word in focus, the system may automatically select a new sentence, which is simpler but includes the word in focus and present it to the user. Thus, the system does not necessarily use the same sentence(s) during this process.

When the word in focus is 5 days deep in memory a new task is presented to the user, e.g. when said pre-defined time interval limit (task milestone) has been reached, which is reading task 1910. In this reading task where e.g. news, articles, etc may being selected which include the word in focus (i.e. reached the pre-defined memory spaced interval limit). Such news may e.g. story about the new Airbus aircraft, how many passengers it can transport etc.

When the word in focus is ten days deep in the users memory, the user 1913 is presented with a writing task where the entries in focus are shown to the user. This writing task runs parallel to the previous tasks. The user is then supposed to write a text that includes the entries in focus. Also, at this time point, a grammar may as an example be exercised. The user then "sends" the text for approval, which may be done with the assistance of a human, or computer instructor, which deems weather the entries have been used correctly and with other comments if any on the text. After the text has been reviewed the text is sent back to the user who is now able to see the mistakes and make corrections accordingly and send back. This process can be iterated until the text is correct.

The final task in the example is the conversation task from as discussed previously in relation to FIGS. 9 and 10 where a conversation is initiated between the user and an instructor, where the instructor is presented with the entries that are in focus. In this case the entry "aircraft" is used to select the focus of the conversation such that this entry will be used spontaneously by the user.

An alternative way to present the present invention is the following example:

Begin example:

This example illustrated our solution for a language learning system according to the present invention:

D1. Personal word spacing: Each person has his/hers own personal forgetting-curve coefficient that is a measure of how easily a person remembers new things. This system determines each language pair forgetting curve, it further determines each person's forgetting-curve coefficient based on their results in memorizing new words. Words are categorized into difficulty levels, based on how difficult they are to remember, and each level has its own difficulty coefficient. Personal spacing is found by combining the current memory retention of a particular word, the personal forgetting curve coefficient for that particular word, the general personal forgetting-curve coefficient and the general word difficulty coefficient that is harvested from responses to that word in the whole user database, to project the next review time.

D2. Personal task spacing: Five different tasks, listed but not limited to a.-e., are currently used in the system, each with a special task-coefficient linked to a person:
 a. Pronounce
 b. Listen
 c. Read
 d. Write
 e. Conversation The task-coefficients are found by an empirical method that determines when the average person is ready to perform a task listed above. Below are the task-coefficients values:

$$\beta_P = t1$$

$$\beta_L = t2$$

$$\beta_R = t3$$

$$\beta_W = t4$$

$$\beta_C = t5$$

To determine when a person is ready to perform a task, i.e. the task milestone, for a selected word, the system combines and fits the word's current memory depth, word difficulty coefficient, the personal forgetting-curve coefficient and the corresponding task-coefficient to a probability distribution. So for example when a person with an average memorizing ability is working with an average difficult word, the listening task would be scheduled when the word is $\beta_L$ minutes deep in memory.

D3. Task-forgetting curve: Each of the tasks has its own task-forgetting (repeatability) curve that is different from the memory forgetting curve. So in this example after having performed the listening task once, it is scheduled again by fitting the personal task forgetting-curve coefficient to the corresponding task-forgetting curve combined with the word task difficulty coefficients.

Let's follow one word through the whole process:

1. The word for "friend" in Japanese, "tomodachi", is added.
2. When entering flashcard learning mode the user is asked to memorize the word "tomodachi" for "friend".
3. After few moments the system prompts the user with a new flashcard and asks for the meaning of "tomodachi". The user can request an example sentence were the missing word is "tomodachi" to aid him to remember the word. When having determined the meaning of the word the user presses show answer. The user now selects true or false depending on whether he/she knew the answer or not. Depending on the user's response the system calculates the word's memory retention with the algorithm described in D1.
4. The system now has one review process going for the word "tomodachi", the memory retention process and the user is prompted with the flashcard for "tomodachi" in intervals based on his memory retention for the word "tomodachi" calculated each time according to D1.
5. The system also has a task scheduler running that monitors when the task review processes are to be started i.e. a task milestone has been reached. So when for example the threshold for the pronunciation task is reached, calculated as described in D2, the pronunciation task process is started and the users gets a pronunciation task for the word "tomodachi". After having completed the task the first time the system now calculates the pronunciation tasks interval according to D3.
6. The system now has two review processes going for the word "tomodachi", the memory retention process and the pronunciation-task retention process, each running independently.
7. This continues until all five task processes explained in D2 are running and the system is running six independent processes (the memory retention process plus the five task processes explained in D2) for the word "tomodachi". These processes continue indefinitely.

End example.

After some usage of the system (could be several days or weeks) the user may come back to the system seeing that there are different tasks that are waiting to be visited. The list of due items for the flashcard reviews as well as the tasks may be as follows: Flashcard reviews 234 cards, pronunciation tasks 23 items, listening tasks 34 items, reading tasks 12 items, writing tasks 6 items, conversation tasks 12 items. The user can choose the order of the tasks. He/she may for example start with conversation, stop after completing 5 items and then go into reading. The system can also be put into "autopilot" mode where the system recommends the order of the tasks and its items for the user for optimal results. This may be based on how much time the user tells the system that he/she can devote on the system for the day, for the week or other periods.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A language learning system adapted to personalize language learning to individual users, comprising:
   a data presenter configured to generate and present learning related data to a user associated with a user ID;
   a receiver adapted to receive, in response to said learning related data, response data from the user indicating the users response to said learning related data;
   a processor that associates said learning related data to said response data so as to couple the response from the user to said learning related data; and
   a database including a storage space associated to the user ID for storing said learning related and said associated response data and thus generating an individualized language knowledge database for the user;
   wherein the data presenter includes at least an electronic display that displays the learning related data to the user in visual form, a speaker that outputs the learning related data to the user in audio form, or another hardware output device that presents the learning related data to the user, the electronic display, the speaker, or the other hardware output device being connected to the processor,
   wherein the receiver includes a keyboard, touch-board mechanism, mouse, speech recognition system, or another hardware user interface that is connected to the processor and receives input from the user as the response data,
   wherein the processor is adapted to:
   issue a true ($t_j$) or false ($f_j$) learning related data indicator indicating whether the response data matches the learning related data presented to the user, the $t_t$ or $f_t$ indicator subsequently being associated to said learning related data and stored at said storage space; and monitor said $t_t$ indicators in said storage space and based thereon repetitively presenting learning related data having associated $t_t$ indicator to the user with user-specific ascending memory spaced interval registered and associated to the learning related data until a pre-defined time interval limit has been reached, and based thereon select at least one task to be presented to the user by said data presenter, the at least one task representing a category of exercises related to a particular language ability learnable through performance of the exercises;

wherein a plurality of task specific exercises included within said at least one task, each of which includes at least one learning related data where said pre-defined interval has been reached, are presented to the user with task time ascending intervals between each task specific exercise in case a user's reply to previous task specific exercises is correct or satisfactory, wherein said task time ascending intervals between each task specific exercise are spaced individually based on determined task specific forgetting curves, each of the task specific forgetting curves being characteristic for each individual task, and each particular task specific forgetting curve being individualized to the user based at least in part on the user's prior performance of the task specific exercises categorized within the particular task, and wherein each of the task specific forgetting curves indicate how entries travel deeper into memory as a function of time.

2. The language learning system according to claim 1, wherein said process of presenting learning related data by said data presenter includes presenting the learning related data in a first language and in a second language simultaneously.

3. The language learning system according to claim 2, wherein subsequent to presenting said user with said learning related data in said first and second languages the user is presented with said learning related data in a first language and at least one suggestion entry of a learning related data in said second language, said input from the user via said receiver being whether said suggestion entry corresponds to said learning related in the second language.

4. The language learning system according to claim 1, wherein said at least one task is run parallel and independent from said process of presenting learning related data by said data presenter, said at least one task being run independent from each other such that while presenting said user with said task specific exercises learning related data are presented to the user simultaneously.

5. The language learning system according to claim 4, wherein said processor is operable to start a new task parallel to said process of presenting learning related data and parallel to the task already being run, said decision of starting said new task being based on monitoring said user-specific ascending memory time interval and utilize said memory spaced as an indicator of a level of memorization of the learning related data by the user.

6. The language learning system according to claim 1, wherein for each individual user, said processor is further operable to utilize said learning related data presented to the user to determine forgetting-curve coefficients for each task, the forgetting-curve coefficients being indicative of how easily each individual user remembers new learning related data specific to each task.

7. The language learning system according to claim 1, wherein said exercises within said tasks are formed by a multiple of learning related data including at least one learning related data where said pre-defined time interval limit has been reached, the processor further being adapted to:

select an exercise in accordance to a set of rules including selecting at least one of the remaining learning related data in said task in accordance to said associated user-specific time intervals so as to optimize and individualize the exercises to the user, receive, in response to exercise presented to the user, response data from the user via said receiver indicating the users response to said exercise;

issue a true-task ($t_t$) or false-task ($f_t$) indicator indicating whether the response data to said exercise is correct or not, the $t_t$ or $f_t$ indicators subsequently being associated to said task or exercise and stored at said storage space; and selecting at least one subsequent exercise based on said $t_t$ or $f_t$ indicators.

8. The language learning system according to claim 1, wherein the exercises within said at least one task are adapted to the individual users with variable time intervals bases on said $t_t$ or $f_t$ indicators.

9. The language learning system according to claim 1, wherein said at least one task is selected from at least one of the following:

a pronunciation task and where said task specific exercises include playing at least one learning related data where said pre-determined interval has been reached to the user and where the user repeats the pronunciation of said learning related data, said language learning system further comprising a speech recognition system for processing the pronunciation from the user so as to determine if the pronunciation is correct or not, where in case the pronunciation is correct a $t_t$ indicator is associated the word, or listening where the exercises include displaying a sentence to the user comprising at least one word where said pre-defined time interval limit has been reached in the sentence(s) is blank, where the said receiver is a key or touch button command where the user replies to the missing word in the blank, the input subsequently being processed and compared with a reference relating data where in case the reply matches with the missing word a $t_t$ indicator is associated to second task;

reading task where the exercises include presenting the user with a paragraph including at least one learning related data where said pre-defined time limit has been reached;

a writing task and where said exercises include that the user writes a sentence including at least one word where said pre-defined time interval has been reached, said sentence subsequently being processed and compared with a pre-stored reference sentences, and where $t_t$ or $f_t$ indicators are associated to said task depending on a match or non-match with said reference sentences;

a conversation task and where the exercises in the conversation task include initiating a conversation between the user and an instructor via a network, the instructor being provided with user specific information including information about pre-defined time interval limit has been reached, the subject of the conversation being selected such that it includes at least one learning related data where said pre-defined time interval limit has been reached;
a combination of one or more of the above mentioned tasks.

10. The language learning system according to claim 1, wherein the processor is further adapted to monitor said $f_I$ indicators in said storage space and based thereon repetitively presenting learning related data having associated $f_I$ indicators to the user with user-specific time intervals until $t_I$ indicators are issued for the users response, the $t_I$ indicators subsequently being associated to said learning related data and said associated response data in said storage space, said step of presenting learning related data having associated $t_I$ indicator to the user with user-specific ascending memory time interval being repeated until a pre-defined time interval limit has been reached.

11. A computer-implemented method of personalizing language learning to individual users, the method being implemented on a computer system that includes a data presenter, a receiver, a processor, and a database,
wherein the data presenter includes at least an electronic display that displays the learning related data to the user in visual form, a speaker that outputs the learning related data to the user in audio form, or another hardware output device that presents the learning related data to the user, the electronic display, the speaker, or the other hardware output device being connected to the processor,
wherein the receiver includes a keyboard, touch-board mechanism, mouse, speech recognition system, or another hardware user interface that is connected to the processor and receives input from the user as the response data,
the method comprising:
generating and presenting, on the data presenter, learning related data to a user associated with a user ID;
receiving, through the receiver, in response to said learning related data, response data from the user indicating the users response to said learning related data;
associating, using the processor, said learning related data to said response data so as to couple the response from the user to said learning related data; and
storing said learning related and said associated response data in the database, the database including a storage space associated to the user ID so as to generate an individualized language knowledge database for the user;
wherein the method further comprises, using the processor:
issuing a true ($t_I$) or false ($f_I$) learning related data indicator indicating whether the response data matches the learning related data presented to the user, the $t_I$ or $f_I$ indicators subsequently being associated to said learning related data and stored at said storage space; and
monitoring said $t_I$ indicators in said storage space and based thereon repetitively presenting learning related data having associated $t_I$ indicator to the user with user-specific ascending memory spaced interval which is registered and associated to the learning related data until a pre-defined time interval limit has been reached, and based thereon select at least one task to be presented to the user by said data presenter the at least one task representing a category of exercises related to a particular language ability learnable through performance of the exercises;
wherein a plurality of task specific exercises included within said at least one task, each of which includes at least one learning related data where said pre-defined interval has been reached, are presented to the user with task time ascending intervals between each task specific exercise in case user's reply to previous task specific exercises is correct or satisfactory,
wherein said task time ascending intervals between each task specific exercise are spaced individually based on determined task specific forgetting curves each of the task specific forgetting curves being characteristic for each individual task, and each particular task specific forgetting curve being individualized to the user based at least in part on the user's prior performance of the task specific exercises categorized within the particular task, and
wherein each of the task specific forgetting curves indicate how entries travel deeper into memory as a function of time.

12. A computer program product tangibly embodied on a computer-readable medium and including executable code that, when executed, is configured to cause one or more processors of a computing device to:
generate and present, on a data presenter, learning related data to a user associated with a user ID, wherein the data presenter includes at least an electronic display that displays the learning related data to the user in visual form, a speaker that outputs the learning related data to the user in audio form, or another hardware output device that presents the learning related data to the user, the electronic display, the speaker, or the other hardware output device being connected to the processor;
receive, through a receiver, in response to said learning related data, response data from the user indicating the users response to said learning related data, wherein the receiver includes a keyboard, touch-board mechanism, mouse, speech recognition system, or another hardware user interface that is connected to the processor and receives input from the user as the response data;
associate said learning related data to said response data so as to couple the response from the user to said learning related data;
store said learning related and said associated response data in a database including a storage space associated to the user ID so as to generate an individualized language knowledge database for the user;
issue a true ($t_I$) or false ($f_I$) learning related data indicators indicating whether the response data matches the learning related data presented to the user, the $t_I$ or $f_I$ indicators subsequently being associated to said learning related data and stored at said storage space;
monitor said $t_I$ indicators in said storage space and based thereon repetitively presenting learning related data having associated $t_I$ indicator to the user with user-specific ascending memory time interval which is registered and associated to the learning related data until a pre-defined time interval limit has been reached, and based thereon select at least one task to be presented to the user by said data presenter, the at least one task representing a category of exercises related to a particular language ability learnable through performance of the exercises,
wherein a plurality of task specific exercises included within said at least one task, each of which includes at least one learning related data where said pre-defined interval has been reached, are presented to the user with task time ascending intervals between each task specific exercise in case user's reply to previous task specific exercises is correct or satisfactory, wherein said task time ascending intervals between each task specific exercise are spaced individually based on determined task specific forgetting curves each of the task specific forgetting curves being characteristic for each individual task, and each particular task specific forgetting curve being individualized to the user based at least in part on the user's prior performance of the task specific exercises categorized within the particular task, and wherein each of the task specific forgetting curves indicate how entries travel deeper into memory as a function of time.

* * * * *